United States Patent [19]

Duvignacq

[11] 4,398,748
[45] Aug. 16, 1983

[54] INCLINABLE SUPPORT, PARTICULARLY FOR CHILD'S CARRIAGE

[75] Inventor: Maurice-Claude Duvignacq, Ciboure St. Jean de Luz, France

[73] Assignee: Baby Relax, Anglet, France

[21] Appl. No.: 180,921

[22] Filed: Aug. 25, 1980

[30] Foreign Application Priority Data

Oct. 2, 1979 [FR] France .................................. 79 24532

[51] Int. Cl.³ .............................................. B62B 7/14
[52] U.S. Cl. .................................... 280/644; 280/650; 280/658; 280/47.39
[58] Field of Search ............... 280/647, 658, 650, 649, 280/648, 644, 643, 642, 47.39, 657; 297/92, 93, 255, 256, 3

[56] References Cited

U.S. PATENT DOCUMENTS

| | | | |
|---|---|---|---|
| 3,390,893 | 7/1968 | MacLaren | 280/644 |
| 4,065,177 | 12/1977 | Hyde | 280/47.39 |
| 4,072,318 | 2/1978 | Laune | 280/42 |
| 4,232,897 | 11/1980 | MacLaren | 280/650 |
| 4,265,466 | 5/1981 | Kassai | 280/648 |

FOREIGN PATENT DOCUMENTS

| | | | |
|---|---|---|---|
| 1340315 | 1/1964 | France | 280/47.39 |
| 2369957 | 6/1978 | France | 280/647 |
| 2406555 | 5/1979 | France | 268/647 |
| 2462323 | 3/1981 | France | 280/650 |

OTHER PUBLICATIONS

WO79/00314, Griffin, Int. Publication date Jun. 14, 1979.

Primary Examiner—David M. Mitchell
Attorney, Agent, or Firm—Irvin A. Lavine

[57] ABSTRACT

The present invention relates to an inclinable support for child's carriage, constituted by a frame which may be folded to form a bundle and by a body pivotally connected to said frame; the body comprises a sling-like seat element permanently connected to longitudinal elements and reversible; the articulation of each longitudinal element on the frame divides it into two substantially unequal parts; the longitudinal elements may rotate through at least 180° from a first horizontal position, their short part facing forwards, up to a second horizontal position, their short part facing rearwardly, the transverse members of the rear bracing elements of the frame being located outside the volume covered by the short part of the body.

12 Claims, 14 Drawing Figures

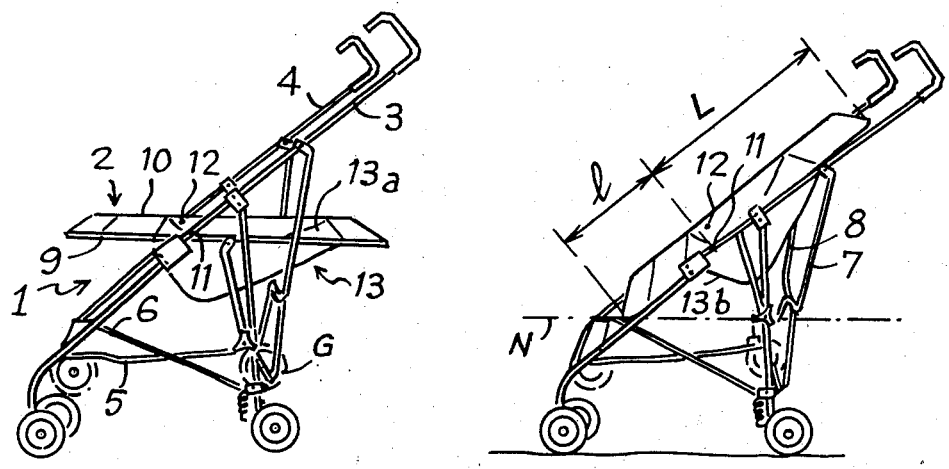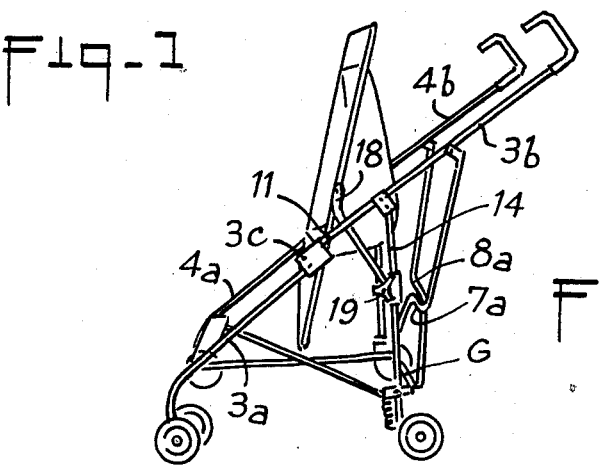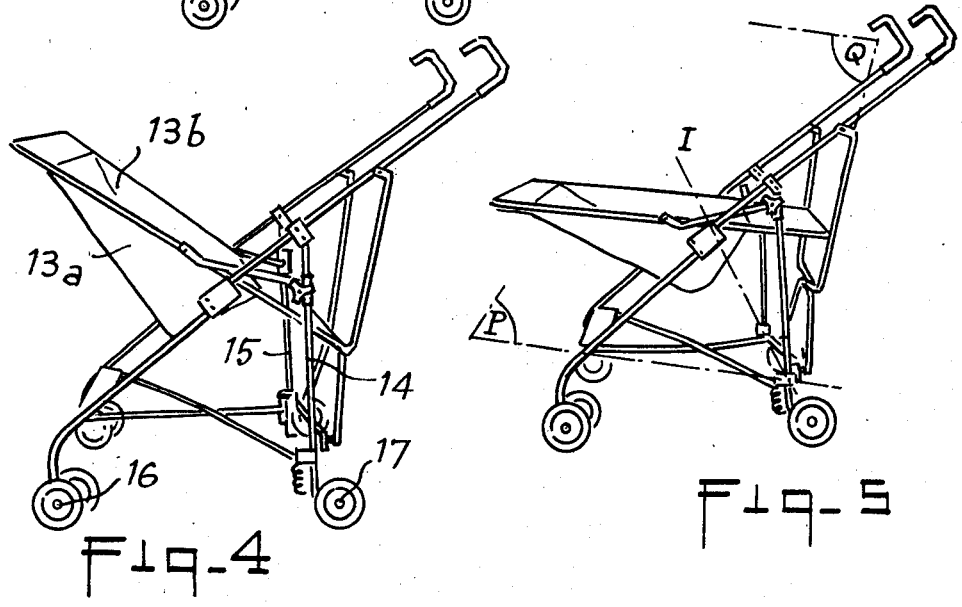

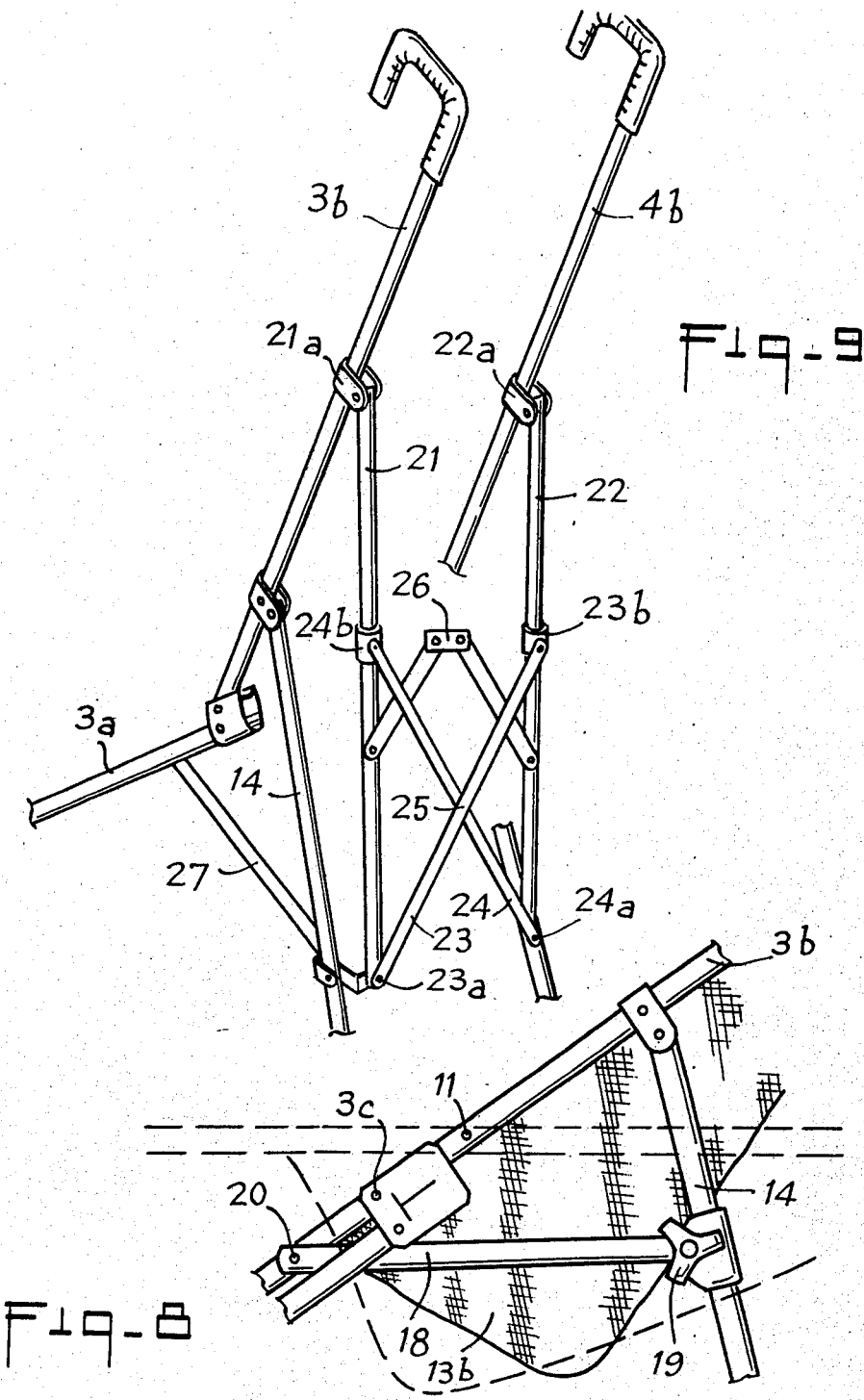

INCLINABLE SUPPORT, PARTICULARLY FOR CHILD'S CARRIAGE

The present invention relates to an improved inclinable support, particularly for a baby carriage.

Baby or children's carriages are known, generally called collapsible strollers or pushchairs, which are constituted by a rolling frame which folds to form a bundle or "stick" and by a body pivotally connected to the frame, allowing a plurality of inclinations of this body between a position wherein the child is sitting up and a position in which he/she is lying down.

In all these known strollers, the child placed in the body faces forwards, i.e. he/she faces the direction of advance of the stroller. This arrangement may present a drawback, particularly when the child is very young since he/she cannot see the person pushing the stroller. In addition, these strollers are relatively low and the child is directly exposed to dust, automobile exhaust, etc . . . at his/her level. However, this arrangement is advantageous for an older child as it gives him/her a much wider field of vision than in the case of an arrangement facing the person pushing the stroller.

It is an object of the present invention to remedy the drawback of "forward facing" strollers, particularly for transporting young children, whilst offering the user the possibility of arranging the body of the stroller in the most favourable position.

To this end, the invention relates to an inclinable support particularly applicable to baby carriages, constituted by a frame adapted to be folded into a bundle and by a body pivotally connected to said frame, this frame comprising two substantially parallel lateral carrier elements, defining, in unfolded position, an inclined frontal plane, each of the elements being composed of two parts pivoted on each other and foldable on themselves, and a structure for supporting said carrier elements comprising, in known manner, folding and bracing elements pivoted with respect to one another and to said carrier elements, so as to form, in unfolded position, a base crosspiece and a rear crosspiece for maintaining said carrier elements in the above-mentioned frontal plane and comprising a transverse folding strut element for bracing the structure in its unfolded position.

In addition, said body is constituted by two longitudinal elements pivoted respectively on the carrier elements and inside same, by a supple seat element extending between the two longitudinal elements, and by means for blocking the inclination of each of the longitudinal elements with respect to the frame.

According to one of the main features of the invention, the above-mentioned seat element, permanently connected to said longitudinal elements, is reversible, and the articulation of each longitudinal element on the frame divides the longitudinal element into two unequal portions; in addition, the longitudinal elements may rotate through about 180° about their articulation from a first "lying down" position of the body in which the longitudinal elements are substantially horizontal, their short portion being turned forwards, up to a second "lying down" position of the body in which the longitudinal elements are substantially horizontal, their short portion turned rearwardly, by a rotation of said short portions downwardly, said base and rear crosspieces being located outside the volume covered by the short portion of the body when it rotates about the said articulation.

According to a preferred embodiment of the invention, the rear crosspiece is constituted by two bars pivoted on each other, each being bent so as to present, in unfolded position, a first upper end part contained substantially in the lateral plane of a carrier element, a second lower end part contained substantially in the lateral plane of the other carrier element, and a substantially horizontal central part connecting said end parts and comprising in its median part the axis of said articulation of the bars on each other, the transverse plane containing the upper end parts forming, with the one containing the lower end parts, an obtuse angle, open towards the front at the level of the edge from which said central parts extend so that the latter are located outside and to the rear of the covered volume mentioned above.

Furthermore, the means for blocking the articulation of the body are constituted by at least one flat bar or rod articulated by one of its ends on the short portion of one of said longitudinal elements, provided with a slot over the whole of its length in which is engaged a fixed stud fast with the frame, the slot being adapted to slide over the stud, and by a means for immobilising the bar at stud level with respect to said stud.

In addition, the slot comprises on each of its edges an indexing notch for receiving said stud when the body is in one or the other of two positions of determined inclination in which it forms seat.

The stud is advantageously constituted by a screw whose head abuts on one of the faces of the bar and which passes through a support fast with the frame, the said immobilisation means being constituted by a manual nut-tightening knob cooperating with said screw.

In another embodiment of the invention, the transverse members of the bracing elements of the rear crosspiece are located substantially beneath the level of the end of the short portion of the longitudinal elements when the latter are in said frontal plane, whilst, in known manner, the lower part of the carrier elements constitutes the front leg of the support whilst its rear leg is constituted by two elements located in the lateral planes of the carrier elements and articulated between the upper part of the latter and the apex of articulation of the base bracing elements on the rear ones; the means for blocking the articulation of the body are constituted by a rod articulated by one of its ends on each of the longitudinal elements and adapted to be immobilised, in a plurality of relative positions, on the corresponding rear leg element.

The rear leg is advantageously substantially symmetrical with the front leg with respect to the vertical passing through the articulation of the body on the frame whilst the rod is articulated on the short portion of each longitudinal element and slides by its free end on said rear leg. In addition, the rear crosspiece is disposed between two parallel elements articulated respectively on each of the ends of said crosspiece and slidably mounted on the upper parts of the carrier elements, one of the ends of the bars of this crosspiece being articulated on one of the elements in its part close to its articulation on the base crosspiece, its other end being mounted to slide on the other element.

Pawls will advantageously have been provided for locking the sliding end of each of said parallel elements on said carrier elements when the frame is unfolded whilst a locking strut element is pivotally disposed either between the sliding ends of the bars of the rear cross piece or directly between the two parallel elements.

The invention will be more readily understood on reading the following description with reference to the accompanying drawings, in which:

FIGS. 1 to 5 schematically illustrate a first embodiment of a support according to the invention, applied to a child's stroller;

FIG. 6 schematically illustrates a variant embodiment of the preceding Figures;

FIGS. 7 and 8 are two diagrams of detail of FIG. 6;

FIG. 9 shows a particular embodiment of a support frame according to the invention;

Figure 6:
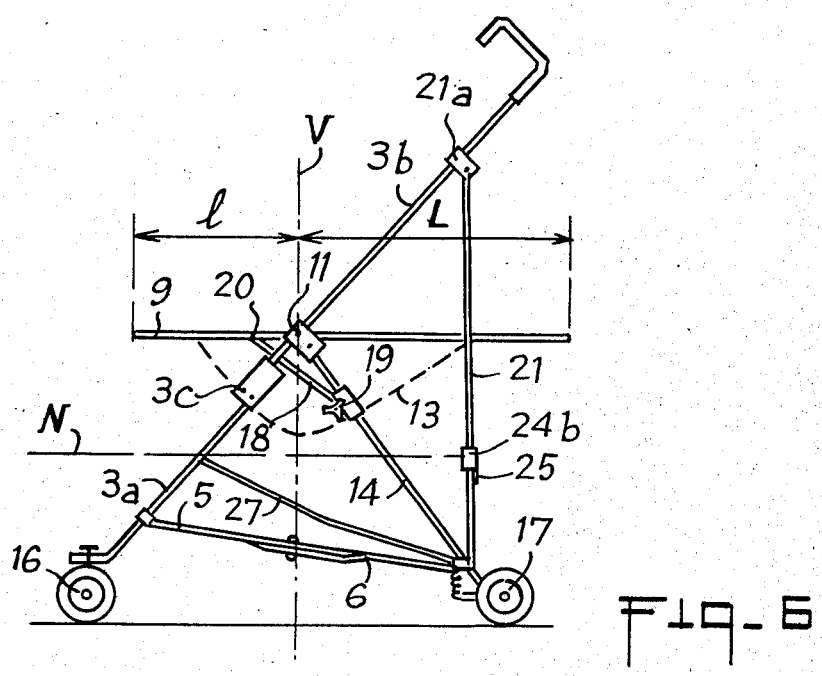
Figure 10:
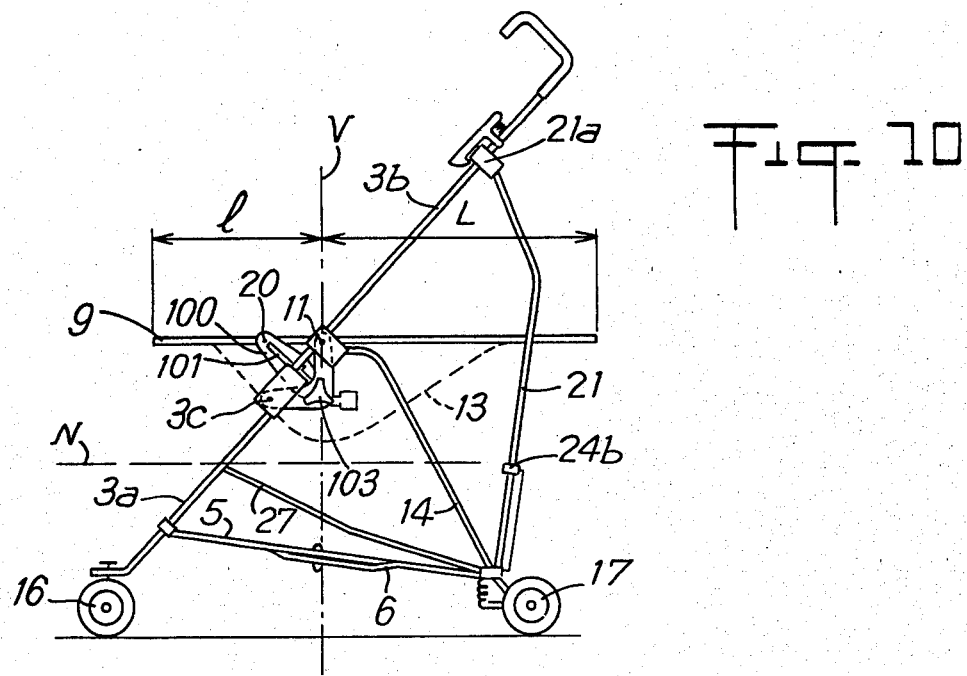
Figure 11:
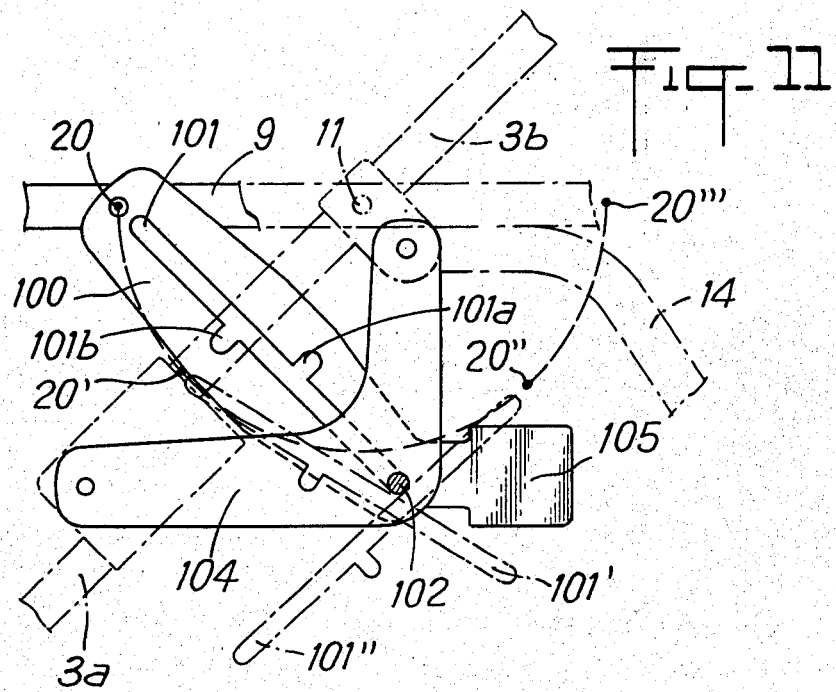

FIG. 10 schematically illustrates a particular variant of the embodiment of FIG. 6;

FIG. 11 is a diagram of detail of FIG. 10.

Figure 12:
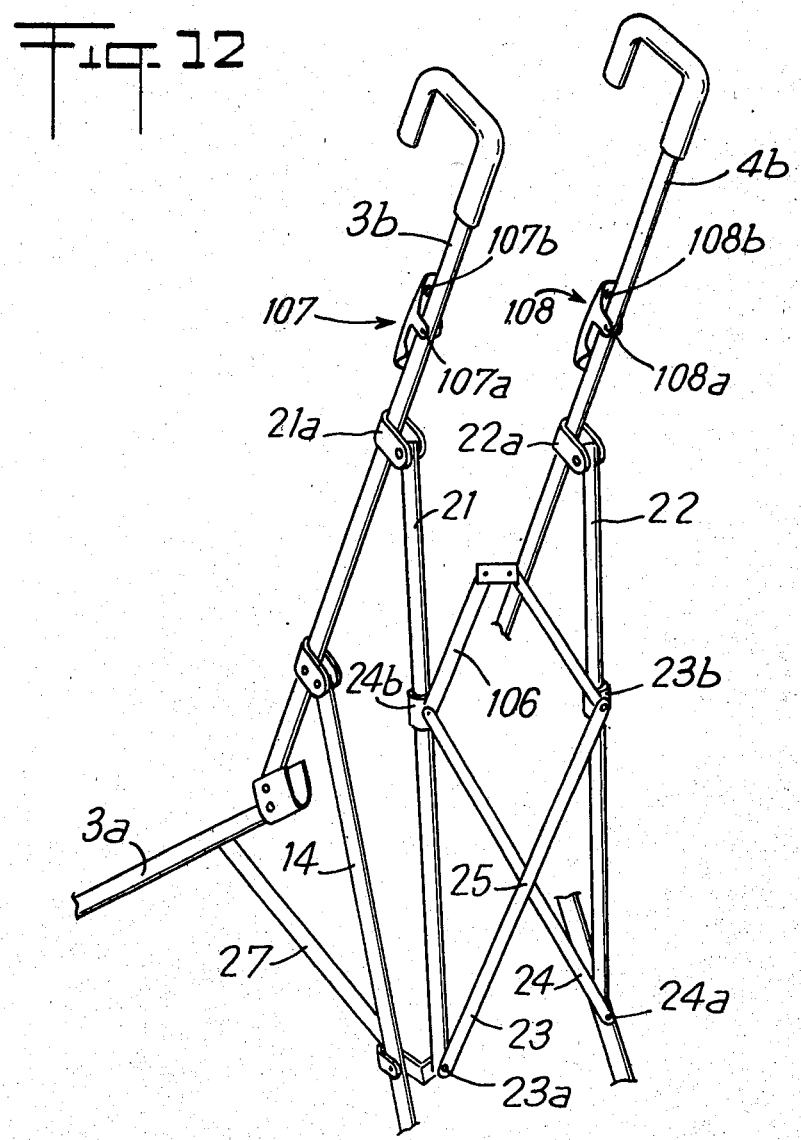
Figure 13:
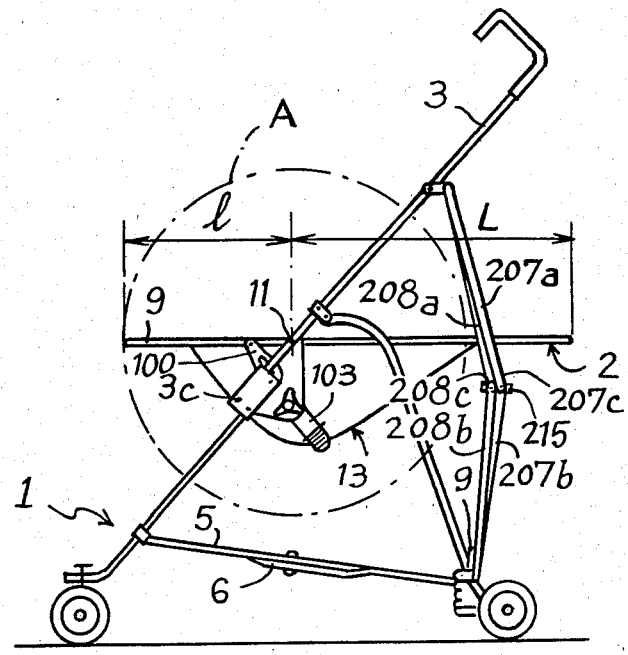
Figure 14:
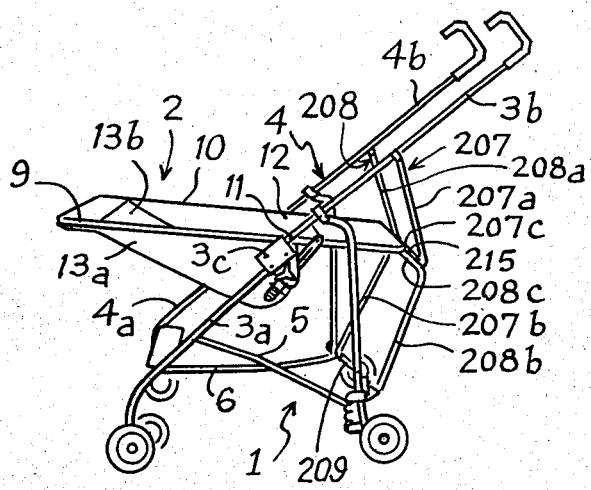

FIG. 12 shows a variant embodiment of the support frame shown in FIG. 9;

FIG. 13 schematically illustrates, by an elevation view, a second embodiment of a support according to the invention, applied to a child's stroller in a first position of the body; and FIG. 14 illustrates, by a perspective view, the support of FIG. 13 in a second position of the body.

Referring now to the drawings, FIGS. 1 to 5 show a child's stroller constituted by a frame 1 and a body 2 pivoted on the frame. The frame 1 comprises in known manner two lateral carrier elements 3 and 4, substantially parallel to each other, defining in unfolded position an inclined frontal plane. Each of these carrier elements 3 and 4 is composed of two parts 3a, 3b; 4a, 4b, articulated on one another (at 3c for the carrier element 3) so as to be foldable on themselves about this articulation. These Figures also show a structure for supporting said carrier elements, constituted by elements for bracing and folding the frame. These elements are contained in two planes P and Q which form, seen laterally, the base and rear side respectively of a triangle whose third side is formed by the frontal plane containing the carrier elements 3 and 4. More precisely, the bracing elements located in the base plane are formed by two bars 5 and 6 in X form (crosspiece) articulated by one of their ends on the lower parts 3a and 4a of the carrier elements. The bracing elements located in the rear plane are constituted by two bent bars 7 and 8, articulated on each other to form an X (crosspiece) and articulated by one of their ends on the upper parts 3b and 4b of the elements 3 and 4. The two base and rear crosspieces are articulated on each other substantially along the intersection I of the planes P and Q. Finally, along this intersection, a folding strut element G, articulated near the two common apices of the said crosspieces, constitutes a means for locking the frame in its unfolded position.

The body 2 of the support shown in these Figures is constituted in known manner by two independent longitudinal elements 9 and 10, substantially parallel and articulated at 11, 12 on the elements 3 and 4. Between these longitudinal elements extends a sling-like seat element 13 which forms a sort of hammock to receive the child's body. Blocking means are provided between the longitudinal elements 9 and 10 and the frame 1 to immobilise the body about its articulations with respect to the frame. The blocking means, of which the embodiment shown in these Figures will be described hereinafter, may be disposed in known manner at the level of the articulations 11 and 12 and may comprise manual tightening knobs.

The above description concerns the arrangements of FIGS. 1 to 5 belonging to known strollers, and the features of the invention will be developed hereinafter. FIGS. 1 and 2 show two possible inclinations of the body 2 with respect to the frame. These inclinations illustrate the limiting positions which it is possible to attain with known strollers. Now, FIG. 3 shows an intermediate stage of inclination in which the longitudinal elements 9 and 10 are substantially vertical, beyond which position the sling-like seat element 2 may be placed in the positions facing the person pushing the stroller, as a seat (FIG. 4) and for a child lying down (FIG. 5).

To obtain this possibility, the seat element 13 must firstly be reversible, although permanently fixed on the longitudinal elements 9 and 10. Thus, its concave, or inner face 13a in FIGS. 1 and 2 becomes convex or outer in FIGS. 4 and 5 and vice versa for its convex face 13b (or outer one) in FIGS. 1 and 2. This possibility comes from the suppleness of the seat element and its mode of fixing to the longitudinal elements which offers the same strength in its two modes of use. Such a seat element generally comprises straps for securing the child. Lateral straps will be attached to the longitudinal elements 9 and 10, whilst, for the crutch strap, a hole will have been provided in the seat element for the strap to pass from one face to the other.

Turning over the seat element also requires the arrangement of the structure of the frame. In fact, the body must be able to rotate and, when in seat position facing the person pushing the stroller (FIG. 4), there must be no obstacle or bracing elements in front of the child.

To this end, the support according to the invention is such that the transverse members 7a and 8a of the rear bracing elements of the frame do not exceed the lower horizontal level N of the body 2 in its forward facing seat position (FIG. 2), i.e. when the longitudinal elements 9 and 10 are substantially in the frontal plane of the elements 3 and 4. Thus, for a symmetrical position of the body (FIG. 4) to this position (FIG. 2) with respect to the vertical plane passing through the articulations 11 and 12, there is no transverse element of the frame in front of the child which might obstruct it.

However, it should be noted that, the lower these transverse members 7a, 8a are positioned, the more their efficiency in their function of bracing is reduced. The rigidity of the whole is therefore affected. Their height is determined by the level N of the lower end of the body. Furthermore, since the position of the articulations 11 and 12 can vary only in modest proportions along the elements 3 and 4 (for reasons of stability of the whole), the level N will be higher as the articulation of the longitudinal elements will be nearer their lower end. Thus, in the invention, the articulations 11 and 12 divide the longitudinal elements into two parts l and L which are substantially unequal. By way of approximate example, L=2l.

Finally, for the body to be able to pass from its position in FIG. 1 (cradle position facing forwards) to that of FIG. 5 (cradle position facing the person pushing the stroller), i.e. by a rotation through at least 180° of the short portion l of the longitudinal elements downwardly, the means for blocking the inclination must be designed and disposed between the body and the frame so as to allow this rotation.

The frame shown in FIGS. 1 to 5 is provided, in addition to its carrier elements and its bracing elements, with a rear leg 14, 15 at the lower end of which are placed the rear wheels 17. The lower part 3a, 4a of the carrier elements 3 and 4 constitutes the front leg provided with the front wheels 16. The elements 14 and 15 are respectively located in the vertical lateral planes of the elements 3 and 4, and extend from their upper parts 3b, 4b on which they are respectively articulated up to the common apices of articulation of the base and rear crosspieces. This arrangement will not be described in greater detail as it belongs to known strollers. The means for blocking the articulations 11 and 12 comprise two identical separate devices for each of the articulations. For articulation 11 for example, they are constituted by a rod 18 articulated at one of its ends on the longitudinal element 11 and mounted to slide by its other end on the element 14 of the rear leg. The slide may be tightened manually to block it on the leg by means of a knob 19. The length of the rod 18 which is flat since it is housed between the longitudinal element and the lateral part of the corresponding frame and its articulation on the body are such that the slide covers the whole length of the element 14 between the two extreme cradle positions of the body (FIGS. 1 and 5).

As shown in FIG. 4, when the body is in the seat position with the child facing the person pushing the stroller, and the longitudinal elements 9, 10 are upwardly inclined, the transverse members 7a and 8a of the rear crosspiece, which extend substantially horizontally (FIG. 3), serve as a footrest for a child placed in the body 2.

Figure 7:
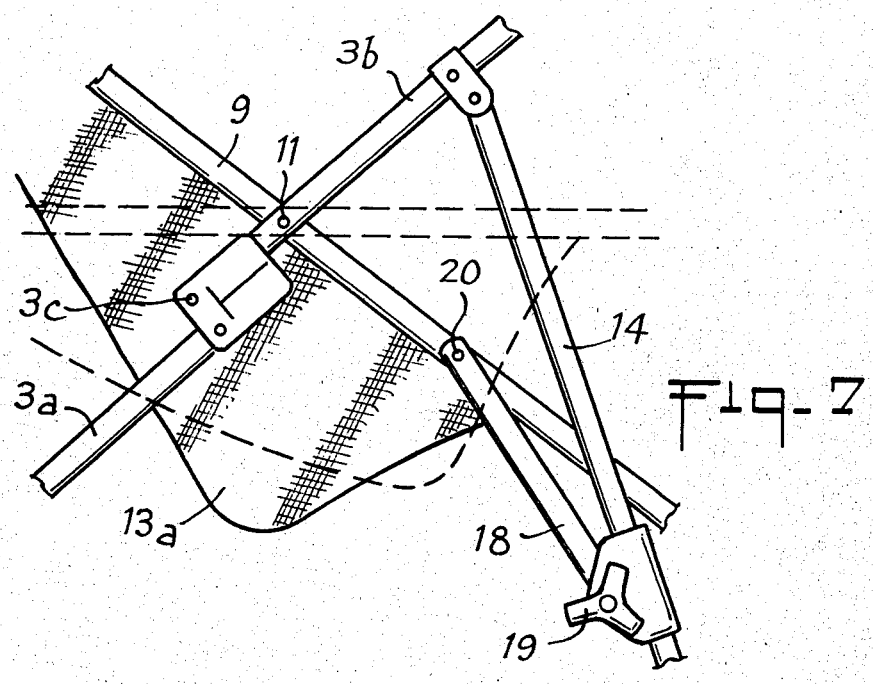

FIGS. 6 to 9 illustrate a variant embodiment of a child's stroller according to the invention. These Figures show certain of the elements already described, with the same references. FIG. 6 shows that the rear leg 14 is disposed substantially symmetrically with the front leg with respect to the vertical plane V passing through the articulation 11. This arrangement, associated with the articulation at 20 of the rod 18 on the short part of the longitudinal element 9, allows a smaller length of rod than in the preceding example, and this rod is always located below the longitudinal element, thus avoiding any risk of injuring the child. In this case, the movement of the slide 19 during a rotation of 180° of the selectively lockable body is reciprocal along the element 14 of the rear leg. FIGS. 7 and 8 show the relative position of these elements for two "seat" positions of the body.

FIGS. 6 and 9 show a variant embodiment of the rear bracing elements (those contained in plane Q) of the frame. These are constituted by two lateral uprights 21 and 22 contained in the lateral planes of the frame (with elements 3, 14 and 4, 15 respectively). These uprights are, at their base, articulated at the end of the base crosspiece 5, 6 (as well as on the rear leg elements 14 and 15 which pass at this point of articulation) and have, at their apex, a slide block 21a, 22a to which they are articulated and which may slide on the upper part 3b, 4b of the carrier elements 3, 4. Bars 23, 24 form a crosspiece articulated at 25, one of the ends of each bar being articulated at the base of one of the uprights (23a, 24a) and its other end on a slide block (23b, 24b) adapted to slide on the other upright. Thus, when the frame is folded up, the crosspiece 23, 24 closes and its ends 23b, 24b join the uprights 21, 22. The movement is the reverse for unfolding. A folding strut element 26 is provided between the two uprights 21, 22. It is articulated by its ends to said uprights so that, in position locking the unfolded position of the frame, it is located substantially at level N previously defined. The slides 23b and 24b are then also located at this level, just above the articulations of the transverse strut element on the uprights. Such an arrangement ensures a very rigid bracing between the two uprights despite the small height over which it is effectively made. The rigidity of the frame is thus comparable with that of heretofore known frames.

Finally, a connecting bar 27 has been placed between each front leg element 3a, 4a and rear leg 14, 15, located in the same lateral plane, said bar reinforcing the rigidity of the whole and ensuring the automatic double folding of the whole. This bar is articulated at its two ends on said elements.

FIG. 10 shows, as in FIG. 6, a child's stroller in which two carrier elements such as 3a and 3b define the inclined side of a triangle whose base comprises a crosspiece 5 and 6 and the rear side two parallel elements such as the one 21 shown in this Figure between which extends a crosspiece shown in greater detail in FIG. 12 of which the upper part is located at the most at level N. A body, formed by two parallel longitudinal elements such as 9, articulated at 11 on the chassis, and by a reversible sling-like seat element 13, may rotate through 180° about articulation 11, the side 1 of the longitudinal elements passing downwardly.

The means for adjusting and blocking the inclination of the body are here constituted by a flat rod 100 articulated at 20 by one of its ends on the short part of the longitudinal element 9, provided over its length with a slot 101 in which a fixed stud fast with the frame is engaged and the slot may slide over this stud. A locking knob 103 cooperates with the stud (which will be referenced 102 in FIG. 11) to immobilise the rod with respect to the stud 102.

FIG. 11 shows on a larger scale the elements constituting the means for adjusting and blocking the inclination of the body with respect to the frame. Of course, the same elements are found for the other longitudinal element (not shown in this Figure).

Thus, stud 102 is fast with a piece 104 in the form of a square, fixed to the upper part 3b of a carrier element of the frame. This square 104 is flat and extends substantially in the lateral plane of the frame. The rod 100 is also flat and is parallel to the piece 104. The stud 102 may be a screw whose head is located behind the rod 100 and abuts on the edges of the slot 101, which screw passes through the slot 101 as well as the piece 104 and which may receive the knob 103 forming nut tightening the rod against the square piece.

These elements being loosened, the body may be inclined; the articulation 20 then passes in a first position 20' in which the stud 102 drops into the notch 101a by the weight of the rod (cf. position 101' of the slot in this position). The body is then immobilised in this position which corresponds to its "forward facing" seat position. Thus, even in the absence of tightening of the knob 103, the body cannot tip beyond this position. If this position is the one desired by the user, it then suffices to tighten the knob 103 to complete immobilisation of the body. To release the body, the rod will be lifted by means of a gripping element 105 with which it is provided at one of its ends. When the inclination of the body is continued around the articulation 11, the stud slides in the slot 101 in the direction of articulation 20 which moves closer then moves away. The rod is then turned over and, when the articulation 20 arrives in its position 20", the rod is such that the slot is in its position 101" and the stud 102 drops in the notch 101b. The position of the body is then indexed in a second position corresponding to its seat position "facing the person pushing the stroller". This position is also a safe position from which the body cannot be released without action on the rod 100 by the means 105. Finally, in the two horizontal positions of the body, the stud 102 abuts at the end of the slot 101 opposite the articulation 20.

In addition, FIG. 12 shows a variant embodiment of the rear bracing elements of the frame with respect to those referenced in the same manner in FIG. 9.

It will be noted that a transverse strut element 106 for maintaining the spaced apart relationship of the two parallel elements 21 and 22 is articulated on the sliding ends 24b and 23b of the bars of the rear crosspiece. In addition, the sliding ends 21a and 22a of the rear elements 21 and 22 of the frame on the upper part 3b and 4b of the frontal carrier elements may be immobilised when the frame is completely unfolded by means of pawls 107 and 108 articulated at 107a and 108a on said elements 3b and 4b and subjected to the action of springs or the like 107b and 108b which tend to close said pawls on the slides 21a and 22a. A rear extension of the pawls which is manually pushed against the springs allows said slides to be unlocked. This arrangement is another solution for ensuring a better transverse rigidity for the structure.

Finally, referring to FIGS. 13 and 14, a child's stroller is found again, constituted by the frame 1 and the body 2 articulated on the frame, the frame 1, comprising the two lateral carrier elements 3 and 4 mentioned above, defining in unfolded position an inclined frontal plane. Each of these carrier elements 3 and 4 is in two parts 3a, 3b, 4a, 4b, articulated on one another (at 3c for the carrier element 3), so as to be foldable on themselves about this articulation. The structure for supporting the carrier elements comprises elements for bracing and folding the frame. More precisely, the bracing elements are formed by two bars 5 and 6 in X form (or base crosspiece) articulated by one of their ends on the lower parts 3a and 4a of the carrier elements. Two bent bars 207 and 208, articulated on each other, form an X (or rear crosspiece) and are articulated by one of their ends on the upper parts 3b and 4b of elements 3 and 4. The two base and rear crosspieces are articulated on each other at the rear base of the stroller where a transverse strut element 209 is located, articulated near the two common apices of the said crosspieces forming a means for locking the frame in its unfolded position.

The body 2 of the support shown in these Figures is constituted in known manner by two independent longitudinal elements 9 and 10, substantially parallel to each other and articulated at 11 and 12 on the elements 3 and 4. Between these longitudinal elements extends a sling-like seat element 13, which forms a type of hammock for receiving the child. Known blocking means such as 100, 103 of FIG. 10 are provided between the longitudinal elements 9 and 10 and the frame 1 to immobilise the body about its articulations with respect to the frame.

It will be seen that this variant embodiment also enables the body 2 to be placed in all the intermediate positions between the forward-facing cradle position (FIG. 13) and the rearward-facing cradle position (FIG. 14).

To this end, the sling-like seat element 13 must be reversible, although permanently fixed to the longitudinal elements 9 and 10, and the body must be rotatable, the articulations 11 and 12 dividing the longitudinal elements into two substantially unequal parts l and L.

In addition, to enable the body to pass from its position in FIG. 13 (forward-facing cradle) to that of FIG. 14 (cradle facing the person pushing the stroller), i.e. by a rotation through about 180° of the short part l of the longitudinal elements downwardly, the elements or bars 5, 6, 207, 208 forming the said base and rear crosspieces must be located outside the volume covered by the short part of the longitudinal elements, shown by A in FIG. 13.

This condition is fulfilled on the one hand if the crosspiece 5, 6 is sufficiently spaced from articulation 11, 12. However, as has been mentioned, it will be advantageous, for reasons of stability of the stroller, to place these points 11, 12 as low as possible, hence the necessity of having a short part l of the body. On the other hand, the rear crosspiece 207, 208 must also be located outside the volume A. The embodiment of the invention for this crosspiece consists in that, in unfolded position, each of the bars 207, 208 is bent so as to present an upper end part 207a, 208a contained in the lateral plane of a carrier element 3, 4, a lower end part 207b, 208b contained in the lateral plane of the other element 4, 3 and a central part 207c, 208c which is substantially horizontal. This central part bears the pivot pin 215 of the crosspiece. In addition, as will be seen more clearly in FIG. 14, the transverse plane containing the upper parts 207a, 208a forms, with the transverse plane containing the lower parts 207b, 208b, an obtuse dihedron open towards the front of the stroller, the central parts 207c, 208c extending at the level of the edge of this dihedron.

This rear crosspiece arrangement in combination with the articulation of the body dividing it into two unequal parts therefore allows the body to rotate, whilst conserving the rear crosspiece's possibility of transversely strengthening the support structure. In fact, the transverse elements and in particular parts 207c, 208c may have been placed relatively high without disturbing the child placed in the body, because it is located well to the rear thereof, this being another solution for maintaining the transverse rigidity of the stroller.

The support according to the invention thus offers the possibility of modifying the inclination and orientation of the child, as desired by the user and depending on the child's age. It consequently has the advantage of satisfying a larger number of clients with the same model and in dimensions close to those of the strollers presently on the market.

Numerous variants may, of course, be made to the invention which is not limited to the present description but covers, on the contrary, all the variants which may be made thereto without departing from the scope thereof.

The invention finds advantageous application in the field of baby and children's articles.

What is claimed is:

1. In an inclinable support particularly applicable to baby carriages, comprising a frame adapted to be folded into a bundle and by a body pivotally connected to said frame,
   a. said frame comprising two substantially parallel, lateral carrier elements, defining, in unfolded position, an inclined frontal plane, each of the elements being composed of two parts articulated on each other and foldable on themselves, and
   b. a structure for supporting said carrier elements, comprising, in known manner, folding and bracing elements articulated on one another and on the carrier elements, so as to form, in unfolded position, a base crosspiece and a rear crosspiece for maintaining said carrier elements in said frontal plane and comprising a transverse strut element for bracing the structure in its unfolded position, c. said body comprising two longitudinal elements articulated respectively on the carrier elements and inside them, the articulation of each said longitudinal element on the frame dividing each said longitudinal element into two substantially unequal parts, including a short part, a supple sling-like seat element extending between and permanently connected to the two longitudinal elements, said sling-like seat element being reversible, and means for blocking the inclination of each of the longitudinal elements with respect to the frame, the said longitudinal body elements being rotatable through about 180° about their articulation between a first "cradle" position of the body in which the longitudinal elements are substantially horizontal, their short part facing forwards, and a second "cradle" position of the body in which the longitudinal elements are substantially horizontal, their short part facing the rear, by a rotation of said short parts downwardly, the base and rear crosspieces being located outside the volume occupied by the short part of the body during its rotation about the said articulation.

2. The support of claim 1, wherein the rear crosspiece comprises two bars articulated on each other, each being bent so as to present, in unfolded position, a first upper end part substantially contained in the lateral plane of a carrier element, a second low end part substantially contained in the lateral plane of the other carrier element, and a substantially horizontal central part connecting said end parts and comprising in its median part the axis of said articulation of the bars on each other, the transverse plane containing the upper end parts forming, with the one containing the low end parts, an obtuse dihedron open towards the front, at the level edge of which extend said central parts so that the latter are located outside and to the rear of the said occupied volume.

3. The support of claim 1, wherein the means for blocking the articulation of the body comprises at least one flat rod articulated at one of its ends on the short part of one of said longitudinal elements and provided with a slot extending substantially its entire length, a fixed stud fast with the frame and extending into the slot for relative sliding movement therewith, and means for selectively immobilizing the rod relative to the stud.

4. The support of claim 3, wherein the immobilizing means comprises on each of the edges of the slot an indexing notch for receiving said stud when the body is in one or the other of two predetermined positions of inclination in which it forms seat, the rod being provided with a gripping part for disengaging the stud from said notches.

5. The support of claim 3, wherein the stud comprises a screw whose head abuts on one of the faces of the rod and which passes through a support fast with the frame, the immobilisation means comprising a manual nut-tightening knob cooperating with said screw.

6. The support of claim 1, wherein the rear crosspiece comprises transverse members located substantially beneath the level of the end of the short part of the longitudinal body elements when the latter are in the frontal plane defined by the lateral carrier elements.

7. The support of claim 6, wherein the inclined carrier elements each has an upper end and a lower part, the lower part of each of the carrier elements defining the lower front leg of the support, and two elements located in the vertical lateral planes of the carrier elements defining rear legs of the support, said two elements articulated to the upper part of the carrier elements and to the point of articulation of the base bracing elements and the rear bracing elements, and the means for blocking the inclination of the longitudinal elements of the body comprising a pair of rods each articulated at one of its ends to one of the longitudinal elements and selectively lockable means for articulating each said rod in a plurality of relative positions on the corresponding rear leg element.

8. The support of claim 7, wherein the rear leg is substantially symmetrical with the front leg with respect to the vertical plane passing through the articulation of the front and rear legs of the support and the carrier elements, and each said rod being articulated on the short part of each longitudinal element, and said selectively lockable means comprising slides on the rear legs, the lower free end of each said rod being articulated to a said slide.

9. The support of claim 6, wherein the bracing elements comprise two parallel elements, said rear crosspiece disposed between said two parallel elements and having each of the ends thereof articulated to said parallel elements, said parallel elements upper ends mounted to slide on the upper parts of the carrier elements, said parallel elements articulated at their lower ends to the base crosspiece, said rear crosspiece comprising two crossed, articulated bars, each one of the ends of the bars being articulated on one of the parallel elements at its part close to its articulation on the base crosspiece, and means mounting the other end of each said bar for sliding movement on the other parallel element.

10. The support of claim 9, wherein said transverse strut element is articulated between and to the two parallel elements for locking the support in unfolded position, said strut element extending in this position, substantially at the level of the said other ends of the bars of the rear crosspiece and at the level of the end of the short part of each of the longitudinal elements when said longitudinal elements are in the frontal plane of the lateral carrier elements.

11. The support of claim 9, and further comprising pawls for locking the sliding upper end of each of said parallel elements on said carrier elements when the frame is unfolded, said transverse strut element having each end thereof pivotally connected to a said means for mounting the said other end of each said bar of the rear crosspiece for sliding movement.

12. The support of claim 9, wherein said rear crosspiece comprises substantially horizontal transverse members which form a foot rest for the child placed in the body when said body is oriented rearwardly with the longitudinal elements upwardly inclined.

* * * * *